3,657,330
PURIFICATION OF TEREPHTHALIC ACID
Johan W. Garritsen, Geleen, and Johannes H. C. M. A. Gregorie, Beek Limburg, Netherlands, assignors to Stamicarbon N.V., Heerlen, Netherlands
No Drawing. Filed Jan. 7, 1970, Ser. No. 1,314
Int. Cl. C07c 51/42, 51/48
U.S. Cl. 260—525                    4 Claims

ABSTRACT OF THE DISCLOSURE

A process is described for the purification of crude terephthalic acid, contaminated with impurities such as para-toluic acid and para-carboxy benzaldehyde, wherein the crude terephthalic acid is dissolved in a solvent mixture of water and acetonitrile at elevated pressures and temperatures in excess of normal boiling temperature of the solvent mixture, and the solution thereafter cooled to a lower temperature to permit recrystallization of purified terephthalic acid from the mother liquor.

---

The present invention relates to a method for the purification of terephthalic acid.

Crude terephthalic acid, which is usually obtained by oxidation of para-xylene or para-cymene, contains intermediate products, such as, and principally, para-toluic acid and para-caboxy benzaldehyde. These intermediate by-product impurities are very difficult to remove from the desired terephthalic acid product. Usual purification methods, such as crystallization of the salts, distillation of the lower alkyl esters, or extraction, are generally ineffective to achieve sufficient removal of these intermediate products, even though a series of recrystallization steps may be employed.

Furthermore, the very low solubility of terephthalic acid in the usual solvents, for instance water, requires large quantities of such solvent and such large quantities of solvent must be heated to temperatures far above the boiling point thereof in high-pressure equipment of large dimensions to accomplish the solution of the acid in order to effect a purification by recrystallization.

These disadvantages have been recognized by proposals such as the purification of the terephthalic acid by extraction with boiling acetonitrile at atmospheric pressure, see U.S. Pat. No. 2,822,388. In this extraction process, para-toluic acid can be removed and obtained as a pure by-product, since terephthalic acid is insoluble in boiling acetonitrile; however, even in this process the terephthalic acid remains impure, still contaminated with para-carboxy benzaldehyde.

A method has now been surprisingly discovered by which terephthalic acid can be purified by re-crystallization procedures from a solution which has been prepared in a pressure vessel at a temperature above the normal boiling point of the solvent, wherein a mixture of water and acetonitrile is used as the recrystallization solvent.

The solubility of terephthalic acid in water alone is quite low, namely: 1.0 g. at 180° C., 2.2 g. at 200° C. and 5.0 g. at 220° C., per 100 g. of solution. The solubility of terephthalic acid in acetonitrile alone is even lower than its solubility in water and amounts to only about 1 g. per 100 g. of solution at 200° C.

Quite unpredictably, however, it has now been found that the solubility of terephthalic acid in various mixtures of water and acetonitrile is considerably higher than it is in either solvent alone. The solubility values for terephthalic acid, measured in different mixtures of water and acetonitrile are given in the table below.

TABLE

| Temperature (° C.) | Water, percent (v./v.) | Acetonitrile, percent (v./v.) | Solubility (g. per 100 g. of solution) |
|---|---|---|---|
| 220 | 90 | 10 | 6.0 |
| 220 | 80 | 20 | 7.0 |
| 220 | 65 | 35 | 7.5 |
| 220 | 50 | 50 | 9.1 |
| 220 | 40 | 60 | 7.8 |
| 220 | 35 | 65 | 6.1 |
| 220 | 20 | 80 | 4.3 |
| 200 | 90 | 10 | 3.0 |
| 200 | 80 | 20 | 3.8 |
| 200 | 65 | 35 | 4.9 |
| 200 | 60 | 40 | 5.1 |
| 200 | 50 | 50 | 5.5 |
| 200 | 30 | 70 | 4.2 |
| 200 | 40 | 60 | 5.1 |
| 200 | 20 | 80 | 3.2 |
| 180 | 80 | 20 | 1.8 |
| 180 | 60 | 40 | 2.5 |
| 180 | 50 | 50 | 2.7 |
| 180 | 35 | 65 | 2.6 |
| 180 | 20 | 80 | 2.1 |
| 180 | 10 | 90 | 1.3 |

Because of this favorable solubility of terephthalic acid in such mixtures, the purification recrystallization process according to the present invention can be carried out either at a lower temperature or in a smaller apparatus as compared to conditions required for a recrystallization from water alone, and with equal production rates. Stated another way, by using the mixed solvent process of this invention, a larger throughput can be achieved in apparatus of the same dimensions, as compared to what can be achieved by the use of water alone.

Moreover, the method according to the invention is effective to eliminate the less readily removable impurities, i.e., both para-toluic acid and para-carboxy benzaldehyde.

In the process according to the invention the acetonitrile may hydrolize to a certain extent. This hydrolysis may be substantially prevented by dissolving the terephthalic acid at a fast rate.

The purified terephthalic acid obtained by this invention is eminently suitable for the preparation of polyester products, without any further treatment thereof being needed.

This invention is further illustrated by the following example thereof.

EXAMPLE

Impure terephthalic acid (45 grams; paracarboxy benzaldehyde content 1%) were rapidly dissolved in a mixture of water (250 l.) and of acetonitrile (250 ml), in an autoclave of 1-liter capacity, at a temperature of 225° C. under a pressure of 30 atmospheres.

The temperature was then reduced to 160° C. at a pressure of 20 atmospheres, and the crystal mass formed was separated from the solution by filtration at this temperature. In this way 31 grams of terephthalic acid product was obtained, which contained only 400 parts per million of paracarboxy benzaldehyde impurity.

The thus-obtained terephthalic acid was rapidly redissolved in a mixture of water (160 ml.) and of acetonitrile (160 ml.), in an autoclave of 0.5-liter capacity, at a temperature of 225° C. under a pressure of 30 atmospheres.

The temperature was thereafter reduced to 160° C., under a pressure of 20 atmospheres, and by filtration at this temperature, 23 grams of purified terephthalic acid was recovered, which now contained less than 100 parts per million of paracarboxy benzaldehyde impurity.

Terephthalic acid of this quality does not need to be purified for preparing polyester products.

The filtrates obtained in the above recrystallizations can be used in pre-purification steps of the reaction mixture crude terephthalic acid.

It will be appreciated that the method of the foregoing examples can be applied utilizing solvent mixtures having a composition other than that specifically illustrated. For instance, one skilled in the art can readily select a desired solvent mixture composition from the foregoing table. Similarly, other temperatures may readily be selected, for a given operation, by simple test to determine the conditions which effect the best recrystallization purification for a given crude terephthalic acid, and, of course, the specific elevated pressure employed is not critical to the practice of the invention so long as pressure is sufficiently high that a liquid phase of the solvent mixture is maintained during the operation.

Otherwise, the practice of this invention essentially utilizes common recrystallization techniques as explained hereinabove.

What is claimed is:

1. A process for the purification of impure terephthalic acid contaminated with para-carboxy benzaldehyde which comprises dissolving said impure terephthalic acid in a solvent comprised of a mixture of from 10 to 90% water and from 90 to 10% acetonitrile by volume, at a temperature above the normal boiling temperature of said solvent, and under an elevated pressure sufficient to maintain a liquid phase of said solvent mixture, to form a solution thereof, thereafter lowering said temperature to a point where a desired quantity of terephthalic acid has recrystallized, and separating and recovering the thus-purified terephthalic acid crystals from the mother liquor, whereby a terephthalic acid product is obtained having an at least substantially reduced quantity of para-carboxy benzaldehyde contaminate therein.

2. The process of claim 1 wherein the recrystallization of terephthalic acid at the lower temperature is also conducted under an elevated pressure to maintain a liquid phase of said solvent mixture at said lower temperature.

3. The process of claim 1 further comprising redissolving the said thus-purified terephthalic acid crystals in a solvent mixture composed of water and acetonitrile and thereafter recrystallizing a second-purified terephthalic acid product by repetition of the steps set forth in claim 1.

4. The process of claim 1 wherein said solvent mixture is composed of from 35 to 65% water and from 65 to 35% acetonitrile by volume.

References Cited

UNITED STATES PATENTS

| | | | |
|---|---|---|---|
| 2,838,565 | 6/1958 | Heath et al. | 260—525 |
| 3,171,856 | 3/1965 | Kurtz | 260—525 |
| 2,822,388 | 2/1958 | Horn et al. | 260—525 |

JAMES A. PATTEN, Primary Examiner

R. S. WEISSBERG, Assistant Examiner

UNITED STATES PATENT OFFICE
CERTIFICATE OF CORRECTION

Patent No. 3,657,330          Dated  April 18, 1972

Inventor(s)  Johan W. Garritsen et al.

It is certified that error appears in the above-identified patent and that said Letters Patent are hereby corrected as shown below:

In the heading to the printed specification, after line 6, insert -- Claims priority, application Netherlands, January 10, 1969, 6900385 --.

Signed and sealed this 22nd day of August 1972.

(SEAL)
Attest:

EDWARD M.FLETCHER,JR.					ROBERT GOTTSCHALK
Attesting Officer					Commissioner of Patents